(12) United States Patent
Mu

(10) Patent No.: US 12,212,409 B2
(45) Date of Patent: Jan. 28, 2025

(54) DATA TRANSMISSION METHOD, DATA TRANSMISSION APPARATUS AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 405 days.

(21) Appl. No.: 17/798,476

(22) PCT Filed: Feb. 11, 2020

(86) PCT No.: PCT/CN2020/074707
§ 371 (c)(1),
(2) Date: Aug. 9, 2022

(87) PCT Pub. No.: WO2021/159270
PCT Pub. Date: Aug. 19, 2021

(65) Prior Publication Data
US 2023/0073253 A1 Mar. 9, 2023

(51) Int. Cl.
*H04W 72/21* (2023.01)
*H04L 1/00* (2006.01)

(52) U.S. Cl.
CPC .................. *H04L 1/0003* (2013.01)

(58) Field of Classification Search
CPC ... H04L 1/0016; H04L 1/0007; H04L 5/0091; H04L 1/0009; H04L 5/0044; H04L 1/0003; H04L 5/0058
See application file for complete search history.

(56) References Cited

U.S. PATENT DOCUMENTS

| 9,407,417 B2 | 8/2016 | Chen et al. |
| 2017/0135098 A1 | 5/2017 | Kang et al. |
| 2022/0061125 A1* | 2/2022 | Lee ........................ H04W 76/18 |
| 2022/0116881 A1* | 4/2022 | Shin ....................... H04L 1/1861 |

(Continued)

FOREIGN PATENT DOCUMENTS

| CN | 106685587 A | 5/2017 |
| EP | 3370458 A1 | 9/2018 |

OTHER PUBLICATIONS

Indian Patent Application No. 202247051133, Office Action dated Dec. 20, 2022, 6 pages.

(Continued)

*Primary Examiner* — Syed Ali
(74) *Attorney, Agent, or Firm* — Cozen O'Connor

(57) ABSTRACT

A data transmission method, a data transmission device and a storage medium are provided. The data transmission method includes: obtaining a first parameter, in which the first parameter is used for indicating a modulation and coding scheme (MCS) index; determining a transport block size (TBS) index according to a mapping relationship table of MCS indexes and TBS indexes, in which the mapping relationship table includes a first number of TBS indexes, and a number of TBS indexes with values smaller than a preset TBS index value in the first number of TBS indexes is less than a second number; and determining a TBS according to the determined TBS index.

15 Claims, 2 Drawing Sheets

(56) References Cited

U.S. PATENT DOCUMENTS

| | | | | |
|---|---|---|---|---|
| 2022/0141857 A1* | 5/2022 | Lee | ............... | H04W 72/23 |
| | | | | 370/329 |
| 2022/0150032 A1* | 5/2022 | Lee | ............... | H04W 56/00 |
| 2022/0216948 A1* | 7/2022 | Yi | ............... | H04L 67/12 |
| 2022/0255704 A1* | 8/2022 | Yi | ............... | H04L 5/0055 |
| 2022/0329301 A1* | 10/2022 | Shin | ............... | H04W 72/02 |
| 2022/0400501 A1* | 12/2022 | Kang | ............... | H04L 5/0048 |
| 2023/0057836 A1* | 2/2023 | Yeo | ............... | H04L 1/1887 |
| 2023/0291531 A1* | 9/2023 | Kim | ............... | H04L 5/0091 |
| 2023/0336312 A1* | 10/2023 | Park | ............... | H04L 5/0044 |

OTHER PUBLICATIONS

European Patent Application No. 20918208.8, Search and Opinion dated Oct. 11, 2023, 11 pages.
Chinese Patent Application No. 202080000245.8, Office Action dated Mar. 3, 2022, 3 pages.
Chinese Patent Application No. 202080000245.8, English translation of Office Action dated Mar. 3, 2022, 6 pages.
KT Corp "Views on DCI contents for eMTC" 3GPP TSG RAN WG1 Meeting #83, R1-157374, Nov. 2015, 4 pages.

* cited by examiner

DATA TRANSMISSION METHOD, DATA TRANSMISSION APPARATUS AND STORAGE MEDIUM

CROSS-REFERENCE TO RELATED APPLICATION

This application is a U.S. national phase of International Application No. PCT/CN2020/074707, filed with the State Intellectual Property Office of P. R. China on Feb. 11, 2020.

TECHNICAL FIELD

The disclosure relates to a field of communication technologies, and particularly to a data transmission method, a data transmission apparatus and a storage medium.

BACKGROUND

Recently, IoT (Internet of Things) technologies such as NB-IoT (Narrow band Internet of Things, NB-IoT) and MTC (Machine Type Communication) are being developed and applied in many different fields, thus bringing convenience to people's life and work. At present, these technologies have been widely used in a smart city, for example, meter reading, a smart agriculture such as collecting information such as temperature and humidity, and a smart transportation such as bicycle sharing.

MTC and NB-IoT may be deployed in the interior of a building or below ground level and thus, their coverage capability is inferior to a conventional LTE user. Due to a hardware restriction of a device, retransmission is adopted in the MTC and NB-IoT to accumulate power, so as to realize coverage enhancement. Simply, the retransmission refers to transmitting same contents in multiple time units. The time unit may be a sub-frame, or may be multiple sub-frames.

For a downlink of the NB-IoT, in Release 16, only the QPSK (Quadrature Phase Shift Keying) modulation mode is supported. In order to further improve a transmission rate of the NB-IoT, the 16 QAM (Quadrature Amplitude Modulation) mode is introduced in Release 17. For a transport block size (TB S) supported by the downlink, the supported maximum number of TBSs can be increased, while for an uplink transmission, it is required to not increase the number of TBSs.

For a downlink of the NB-IoT, DCI (Downlink Control Information) includes an MCS (Modulation and coding scheme) field occupying four bits and used to indicate a downlink MCS index (I_MCS), and a TBS index (I_TBS) can be determined based on a relationship between the MCS index and the TBS index. Typically, in the downlink, I_MCS=I_TBS. Further, the transmitted TBS can be determined based on the TBS index and assigned resource amount. However, the existing mapping relationship between the TBS and the MCS does not support 16 QAM, such that a new relationship between the TBS and the MCS needs to be defined after introducing 16 QAM. The mapping between the TBS and the MCS can affect a system performance, such that how to configure the mapping relationship between the MCS and the TBS is an urgent problem to be solved.

SUMMARY

In order to solve problems in the related art, the disclosure provides a data transmission method, a data transmission apparatus and a storage medium.

According to a first aspect of embodiments of the disclosure, a data transmission method is provided. The method includes: obtaining a first parameter, in which the first parameter is configured to indicate a modulation and coding scheme (MCS) index; determining a transport block size (TBS) index based on a mapping relationship table of MCS indexes and TBS indexes, in which the mapping relationship table comprises a first number of TBS indexes, and a number of TBS indexes with values less than a predetermined TBS index value in the first number of TBS indexes is less than a second number; and determining a TBS based on the determined TBS index.

According to a second aspect of the embodiments of the disclosure, a data transmission apparatus is provided. The apparatus includes an obtaining unit and a processing unit. The obtaining unit is configured to obtain a first parameter, in which the first parameter is configured to indicate a modulation and coding scheme (MCS) index. The processing unit is configured to determine a transport block size (TBS) index based on a mapping relationship table of MCS indexes and TBS indexes, in which the mapping relationship table comprises a first number of TBS indexes, and a number of TBS indexes with values less than a predetermined TBS index value in the first number of TBS indexes is less than a second number; and determine a TBS based on the determined TBS index.

According to a third aspect of the embodiments of the disclosure, a data transmission device is provided. The device includes: a processor, and a memory configured to store instructions executable by the processor. The processor is configured to perform the data transmission method according to the first aspect or any implementation of the first aspect.

According to a fourth aspect of the embodiments of the disclosure, a non-transitory computer-readable storage medium is provided. When instructions stored in the storage medium are executed by a processor of a mobile terminal, the mobile terminal is caused to perform the data transmission method according to the first aspect or any implementation of the first aspect.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Figure 1:
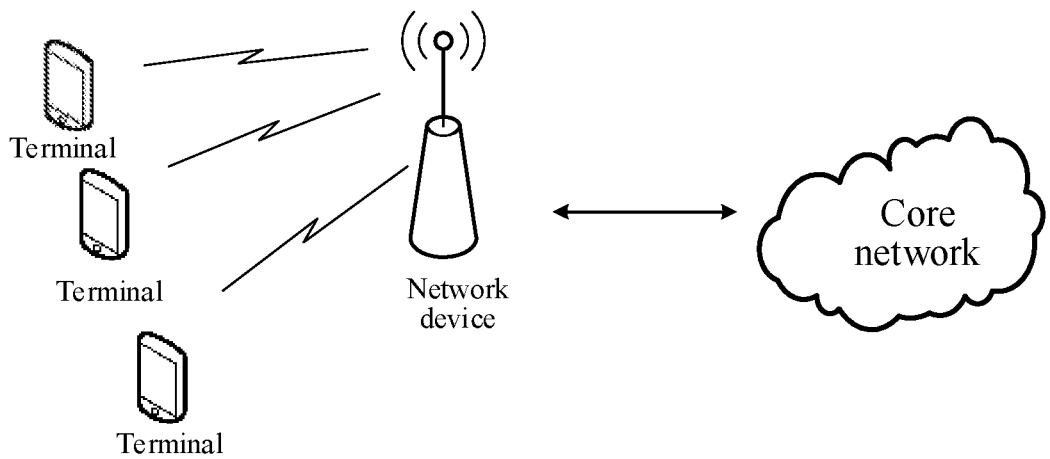
FIG. 1 is a schematic diagram illustrating a communication system according to an embodiment.

The disclosure provides a data transmission method, which may be applied in a wireless communication system illustrated in FIG. 1. As illustrated in FIG. 1, a terminal is accessed to a network via a network device such as a base station. The network device and a core network complete a data backhaul and a forward transmission of data for various communication services.

It should be understood that the wireless communication system is a network providing a wireless communication function. The wireless communication system may adopt different communication technologies, for example code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to factors of different networks, such as capacities, rates and time latencies, the networks can be classified to a 2G (the second generation) network, a 3G network, a 4G network or a future evolution network, such as a 5G network. The 5G network may be also referred to as a new radio (NR) network. For convenience of description, the wireless communication network may be called as network or system for short in the disclosure. The network in the disclosure may include a radio access network (RAN) and a core network (CN).

The network includes a network device. The network device, for example, may be a wireless access network node, a core network device and so on. The wireless access network node may be also referred to as base station. The network may provide network services to the terminal through the network device. Different operators may provide different network services to the terminal, which can be understood that different operators correspond to different operator networks.

The terminal, which may be referred to as user equipment (UE), mobile station (MS), mobile terminal (MT) or the like, is a device providing speech and/or data connectivity to users. For example, the terminal may be a handhold device, a vehicle mounted device having a wireless connection function. At present, the terminal may be, for example, a mobile phone, a pocket personal computer (PC), a palmtop, a personal digital assistant (PDA), a notebook computer, a tablet computer, a wearable device, a vehicle-mounted device or the like.

In order to support Internet of Things (IoT) services, IoT technologies such as NB-IoT (Narrow band Internet of Things, NB-IoT) and MTC (Machine Type Communication) are proposed. Retransmission is adopted in the MTC and NB-IoT to accumulate power, so as to realize coverage enhancement.

For a downlink of the NB-IoT, DCI (Downlink Control Information) includes an MCS (Modulation and coding scheme) field occupying four bits and used to indicate a downlink MCS index (I_MCS), and a TBS index (I_TBS) can be determined based on a relationship between the MCS index and the TBS index. Typically, in the downlink, I_MCS=I_TBS. Further, the transmitted TBS can be determined based on the TBS index and assigned resource amount. For example, a TBS table of the NB-IoT is shown in Table 1. $I_{TBS}$ represents a TBS index value, and $I_{SF}$ represents an assigned resource amount. Take the assigned resource amount being sub-frame (SF) as an example. The assigned resource amount may be a resource unit such as a frame, or a physical resource block. The figures in Table 1 are TBSs determined based on the TBS indexes and the assigned resource amount. For example, when $I_{TBS}$=10 and $I_{SF}$=2, the corresponding TBS is 504. For a single transmission of the NB-IoT, the supported maximum TBS is 680.

TABLE 1

| | $I_{SF}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

The TBS table of the NB-IoT shown in Table 1 is clipped based on the LTE TBS table. A part of the LTE TBS table is shown in Table 2. The TBS table of the NB-IoT basically captures a part of LTE TBS table which corresponds to TBS=0-13 and $N_{PRB}$=1, 2, 3, 4, 5, 6, 8 and 10, where $N_{PRB}$ represents the number of physical resource blocks (PRBs).

TABLE 2

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

For a downlink of the NB-IoT, in Release 16, only the QPSK (Quadrature Phase Shift Keying) modulation mode is supported. In order to further improve a transmission rate of the NB-IoT, the 16 QAM (Quadrature Amplitude Modulation) mode is introduced in Release 17. For a transport block size (TBS) supported by the downlink, the supported maximum number of TBSs can be increased, while for an uplink transmission, it is required to not increase the number of TBSs.

Since the higher order of modulation mode is introduced, the TBS table can be expanded. Table 3 shows an example. A range of the TBS indexes is expanded from 0-13 to 0-20.

TABLE 3

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |
| 7 | 104 | 224 | 328 | 472 | 584 | 712 | 968 | ~~1288~~ 1352 |
| 8 | 120 | 256 | 392 | 536 | 680 | 808 | 1096 | 1384 |
| 9 | 136 | 296 | 456 | 616 | 776 | 936 | ~~1288~~ 1352 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1000 | ~~1288~~ 1352 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | ~~1288~~ 1352 | 1608 | 1928 | 2600 | 3240 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | ~~1288~~ 1352 | 1736 | 2152 | 2600 | 3496 | 4264 |
| 20 | 440 | 904 | 1384 | 1864 | 2344 | 2792 | 3752 | 4584 |

In the related art, DCI (Downlink Control Information) includes four bits used to indicate the MCS index (I_MCS), and further a mapping relationship between the MCS indexes and the TBS indexes is stipulated in the protocol. For example, for the downlink scheduling, the MCS index is equal to the TBS index, and meanwhile, the modulation modes are both QPSK. For an uplink transmission, a mapping relationship between the TBS indexes and the MCS indexes is shown in Table 4.

TABLE 4

| MCS Index $I_{MCS}$ | Modulation Order $Q_m$ | TBS Index $I_{TBS}$ |
|---|---|---|
| 0 | 1 | 0 |
| 1 | 1 | 2 |
| 2 | 2 | 1 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |

As shown in Table 4, the mapping relationship between the TBS indexes and the MCS indexes does not support 16 QAM. A new mapping relationship between the TBS indexes and the MCS indexes needs to be defined after introducing 16 QAM. The mapping between the TBS and the MCS can affect a performance of the entire system.

During a data transmission supporting 16 QAM, typically, a channel condition is good and there are few opportunities to use the TBS index with a smaller index value.

Accordingly, the embodiments of the disclosure provide a data transmission method, the mapping relationship between the MCS indexes and the TBS indexes used in the data transmission method needs to support the data transmission of 16 QAM. It is required to introduce the TBS index supporting 16 QAM on the basis of the existing TBS index, which may cause that the total number of TBS indexes is more than the number of the supported MCS indexes, for example exceeding 16. In this case, for the specified number of TBS indexes, the mapping relationship between the TBS indexes and the MCS indexes is established. Further, in the embodiments of the disclosure, in order to meet a better channel condition, it is required to restrict the number of TBS indexes with smaller TBS index values in the mapping relationship between the MCS indexes and the TBS indexes, and more TBS indexes with bigger TBS index values are used, so as to implement using the TBS indexes with bigger index values to map the MCS indexes during the data transmission, thus meeting a communication requirement of 16 QAM and ensuring a system performance.

Figure 2:
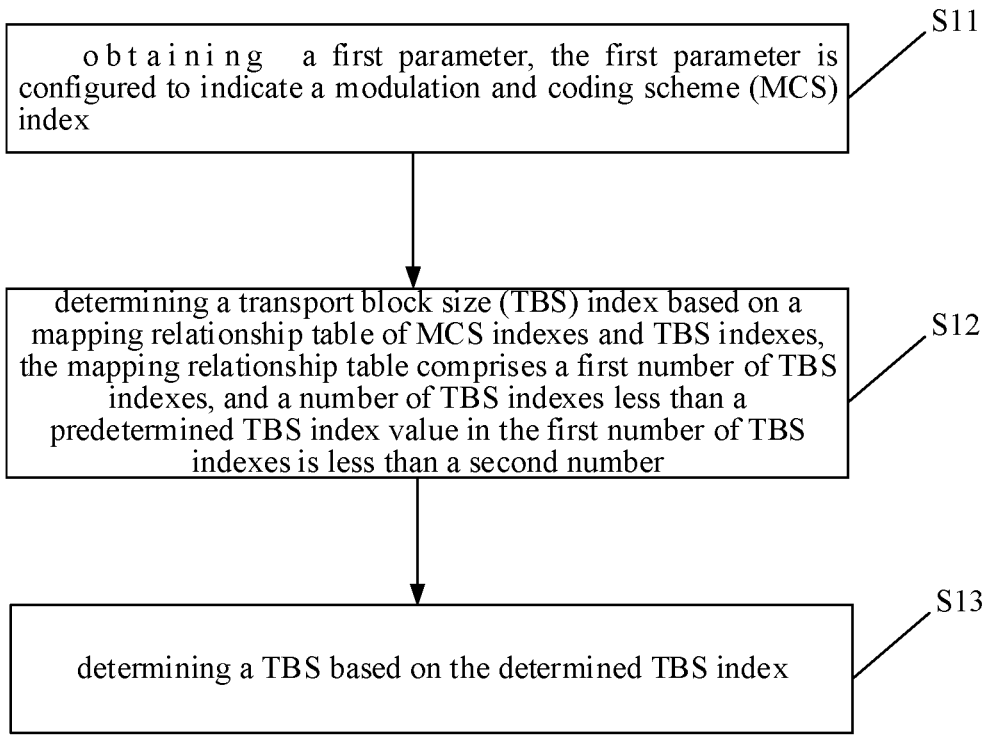
FIG. 2 is a flowchart illustrating a data transmission method according to an embodiment of the disclosure.

FIG. 2 is a flowchart illustrating a data transmission method according to an embodiment of the disclosure. As illustrated in FIG. 2, the data transmission method can be applied in a terminal, and can include the followings.

At block S11, a first parameter is obtained.

In the embodiment of the disclosure, the first parameter is configured to indicate an MCS index. The first parameter can be sent by a network device to the terminal based on a DCI signaling, to indicate the MCS index.

At block S12, a TBS index is determined based on a mapping relationship table of MCS indexes and TBS indexes.

The mapping relationship table of the MCS indexes and the TBS indexes in the embodiment of the disclosure includes a specified number of TBS indexes. For convenience of description, the number of TBS indexes included in the mapping relationship table of the MCS indexes and the TBS indexes in the embodiment of the disclosure is referred to as a first number.

In the embodiment of the disclosure, the first number of TBS indexes in the mapping relationship table of the MCS indexes and the TBS indexes can be TBS indexes with bigger TBS index values captured from the LTE TBS table.

Further, in the embodiment of the disclosure, in order to restrict the number of TBS indexes with smaller TBS index values in the first number of TBS indexes, a predetermined TBS index value may be set, to restrict the number of the TBS indexes with TBS index values less than the predetermined TBS index value in the first number of TBS indexes to be less than a second number.

The predetermined TBS index value may be a fixed index threshold stipulated in the protocol. The number of the TBS indexes with TBS index values less than the predetermined TBS index value can be set according to actual conditions. In one case, the second number may be less than or equal to the predetermined TBS index value. For example, the predetermined TBS index value is M, the number of the TBS indexes with TBS index values less than the predetermined TBS index value is less than M. For example, the predetermined TBS index value is 10, the number of the TBS indexes with TBS index values less than TBS index=10 in the mapping relationship table needs to be less than 10.

At block S13, a TBS is determined based on the determined TBS index.

In the embodiment of the disclosure, after determining the MCS index used in a data transmission, the terminal may determine the TBS index in the data transmission based on the mapping relationship table of the MCS indexes and the TBS indexes. After determining the TBS index, the transmitted TBS can be determined using a mapping relationship between the TBS index and $I_{SF}$. And data can be transmitted based on the determined TBS.

In the embodiments of the disclosure, the mapping relationship table of the MCS indexes and the TBS indexes mentioned in the embodiments of the disclosure can be explained below in combination with actual applications.

In the embodiments of the disclosure, the number of the TBS indexes in the mapping relationship table of the MCS indexes and the TBS indexes is determined according to the value of $I_{SF}$. Different values of $I_{SF}$ can correspond to different numbers of the TBS indexes. For example, for x different values of $I_{SF}$, each value of $I_{SF}$ corresponds to a distinct TBS index value.

In the embodiments of the disclosure, for different assigned resource amounts $I_{SF}$, the same MCS index in the mapping relationship table of the MCS indexes and the TBS indexes may correspond to the same or different TBS indexes.

In an implementation of the embodiment of the disclosure, for the TBS index with a smaller TBS index value in the LTE TBS table, for example, TBS Index 0~z, no TBS index or few TBS indexes are used to map the MCS indexes. z can be understood as the predetermined TBS index value mentioned in the embodiments of the disclosure.

Further, in the embodiments of the disclosure, the TBS indexes in the first number of TBS indexes have continuous or discontinuous index values. The TBS indexes with values less than the predetermined TBS index value in the first number of TBS indexes may have continuous or discontinuous index values. The TBS indexes with values greater than the predetermined TBS index value in the first number of TBS indexes may have continuous or discontinuous index values.

In an implementation, the TBS indexes with values less than the predetermined TBS index value in the first number of TBS indexes have discontinuous index values. The TBS indexes with values greater than the predetermined TBS index value in the first number of TBS indexes may have continuous index values. In an example, 19 TBS indexes are included in the LTE TBS table. The TBS indexes with values of 1, 3, 5, 7, and 8~19 may be extracted to map the MCS indexes, or the TBS indexes with values of 4~19 may be extracted to map the MCS indexes.

In the embodiments of the disclosure, for different assigned resource amounts, the same or different TBS indexes are supported.

In an implementation, under different resource assignments, the TBS indexes are different. For example, for $I_{SF}=1$, the index values of the TBS indexes extracted to map the MCS indexes are 1, 3, 5, 7, and 8~19. For $I_{SF}=4$, the index values of the TBS indexes extracted to map the MCS indexes are 4~19. In the embodiments of the disclosure, for different resource assignments, a main consideration of extracting different TBS indexes is a limitation on the maximum TBS. Under different resource assignments, the effective TBSs which can be used are different. For example, for some resource assignments, 21 effective TBSs can be used. For some resource assignments, only 18 effective resources can be assigned. Thus, for different resource assignments, different TBS indexes are extracted.

In the embodiments of the disclosure, for different assigned resource amounts, modulation modes corresponding to the same MCS index are the same or different.

In the embodiments of the disclosure, under different resource assignments, the modulation mode used for each MCS index may be the same or different. Since there is a limitation on the maximum TBS in the exiting TBS table, the TBS indexes capable of using the QPSK modulation mode may be different. Thus, after introducing 16 QAM, the TBS not supported by the original system, for example for the downlink, the TBS indexes greater than the maximum TBS 680 bit of the original system can use 16 QAM. Thus, for different assigned resource amounts, the same MCS index uses different modulation modes.

In the embodiments of the disclosure, the mapping relationship table of the MCS indexes and the TBS indexes mentioned in the embodiments of the disclosure can be explained below in combination with actual applications.

In an example, the mapping relationship table of the MCS indexes and the TBS indexes is shown in Table 5. In Table 5, the first number is 16, the predetermined TBS index value is 5 and the second number is 5. As illustrated in Table 5, the mapping relationship table of the MCS indexes and the TBS indexes includes 16 TBS indexes, and the number of the TBS indexes with the TBS index values less than 5 is 2. The TBS indexes with the TBS index values less than 5 have discontinuous index values, which are TBS index 1 and TBS index 3, respectively.

Further, as shown in Table 5, in each mapping relationship between the MCS index and the TBS index, the MCS index value is different from the TBS index value. For example, the MCS index 0 corresponds to the TBS index 1, the MCS index 1 corresponds to the TBS index 3 . . . the MCS index 15 corresponds to the TBS index 18. Of course, in each mapping relationship between the MCS index and the TBS index, the MCS index value may be the same as the TBS index value. For example, the MCS index 0 corresponds to the TBS index 0, which is not limited herein.

In an embodiment, for different assigned resource amounts, correspondences between the MCS indexes and the TBS indexes are the same and the MCS indexes correspond to a same modulation mode. For example, as shown in Table 5, the MCS index 0 corresponds to the TBS index 1 and the corresponding modulation mode is QPSK. For all assigned resource amounts, the MCS index 0 corresponds to the TBS index 1 and the corresponding modulation mode is QPSK.

TABLE 5

| MCS Index $I_{MCS}$ | Modulation Order $Q_m$ | TBS Index $I_{TBS}$ |
|---|---|---|
| 0 | 2 | 1 |
| 1 | 2 | 3 |
| 2 | 2 | 5 |
| 3 | 2 | 6 |
| 4 | 2 | 7 |
| 5 | 2 | 8 |
| 6 | 2 | 9 |
| 7 | 2 | 10 |
| 8 | 2 | 11 |
| 9 | 2 | 12 |
| 10 | 2 | 13 |
| 11 | 4 | 14 |
| 12 | 4 | 15 |
| 13 | 4 | 15 |
| 14 | 4 | 17 |
| 15 | 4 | 18 |

It should be understood that, each element in Table 5 exists independently. These elements are listed in the same table for example, but it does not mean that all elements in the table should exist at the same time, as shown in the table. The value of each element is independent on the value of any other element in Table 5. Thus, those skilled in the art may understand that the value of each element in Table 5 can be considered as an independent embodiment.

In another example, the mapping relationship table of the MCS indexes and the TBS indexes is shown in Table 6. In Table 6, the first number is 16, the predetermined TBS index value is 5 and the second number is 5. As illustrated in Table 6, the mapping relationship table of the MCS indexes and the TBS indexes includes 16 TBS indexes. The TBS indexes with the TBS index values greater than 5 have continuous index values, and the TBS indexes with the TBS index values less than 5 have discontinuous or continuous index values. Under different assigned resource amounts, the captured TBS indexes are different. For the assigned resource amounts I_SF=0, 1, the number of the TBS indexes with the TBS index values less than 5 is 2, and the TBS index values are discontinuous, which are TBS index 1 and TBS index 3, respectively. For the assigned resource amounts I_SF=2, 3, the number of the TBS indexes with the TBS index values less than 5 is 3, and the TBS index values are discontinuous, which are TBS index 1, TBS index 3, and TBS index 4, respectively. For the assigned resource amounts I_SF=4, 5, 6, and 7, the number of the TBS indexes with the TBS index values less than 5 is 5, and the TBS index values are continuous, which are TBS index 0-TBS index 4, respectively.

Further, as shown in Table 6, in each mapping relationship between the MCS index and the TBS index, the MCS index value and the TBS index value may be the same or different. For example, for the MCS index 0, when I_SF=0, 1, I_SF=2, 3, the MCS index 0 corresponds to the TBS index 1. When I_SF=4, 5, 6, 7, the MCS index 0 corresponds to the TBS index 0.

In an embodiment, for different assigned resource amounts, the correspondences between the MCS indexes and the TBS indexes are not all the same, and the MCS indexes correspond to the same modulation mode. As shown in Table 6, for the MCS index 0, when I_SF=0, 1, the MCS index 0 corresponds to the TBS index 1, and the MCS index 0 corresponds to the modulation mode QPSK. When I_SF=2, 3, the MCS index 0 corresponds to the TBS index 1, and the MCS index 0 corresponds to the modulation mode QPSK. When I_SF=4, 5, 6, 7, the MCS index 0 corresponds to the TBS index 0, and the MCS index 0 corresponds to the modulation mode QPSK.

TABLE 6

| MCS Index $I_{MCS}$ | Modulation Order $Q_m$ | TBS Index $I_{TBS}$ | | |
|---|---|---|---|---|
| | | I_SF = 0, 1 | I_SF = 2, 3 | I_SF = 4, 5, 6, 7 |
| 0 | 2 | 1 | 1 | 0 |
| 1 | 2 | 3 | 3 | 1 |
| 2 | 2 | 5 | 4 | 2 |
| 3 | 2 | 6 | 5 | 3 |
| 4 | 2 | 7 | 6 | 4 |
| 5 | 2 | 8 | 7 | 5 |
| 6 | 2 | 9 | 8 | 6 |
| 7 | 2 | 10 | 9 | 7 |
| 8 | 2 | 11 | 10 | 8 |
| 9 | 2 | 12 | 11 | 9 |
| 10 | 2 | 13 | 12 | 10 |
| 11 | 4 | 14 | 13 | 11 |
| 12 | 4 | 15 | 14 | 12 |
| 13 | 4 | 16 | 15 | 13 |
| 14 | 4 | 17 | 16 | 14 |
| 15 | 4 | 18 | 17 | 15 |

It should be understood that, similarly to Table 5, each element in Table 6 exists independently. These elements are listed in the same table for example, but it does not mean that all elements in the table should exist at the same time, as shown in the table. The value of each element is independent on the value of any other element in Table 6. Thus, those skilled in the art may understand that the value of each element in Table 6 can be considered as an independent embodiment.

In another example, the mapping relationship table of the MCS indexes and the TBS indexes is shown in Table 7. In Table 7, the first number is 16, the predetermined TBS index value is 5 and the second number is 5. As shown in Table 7, the mapping relationship table of the MCS indexes and the TBS indexes includes 16 TBS indexes. TBS index values of the TBS indexes greater than 5 are continuous. TBS index values of the TBS indexes less than 5 are discontinuous or continuous. Different TBS indexes are captured for different assigned resource amounts. For the assigned resource amounts I_SF=0, 1, there are two TBS indexes with TBS index values less than 5, which are discontinuous, respectively TBS index 1 and TBS index 3. For the assigned resource amounts I_SF=2, 3, there are three TBS indexes with TBS index values less than 5, which are discontinuous, respectively TBS index 1, TBS index 3 and TBS index 4. For the assigned resource amounts I_SF=4, 5, 6, 7, there are five TBS indexes with TBS index values less than 5, which are continuous, respectively TBS index 0-TBS index 4.

In an embodiment, for different assigned resource amounts, the correspondences between the MCS indexes and the TBS indexes are not all the same, and the modulation modes correspond to the MCS indexes are not all the same. As shown in Table 7, for the MCS index 0, when I_SF=0, 1, the MCS index 0 corresponds to the TBS index 1, and the MCS index 0 corresponds to the modulation mode QPSK. When I_SF=2, 3, the MCS index 0 corresponds to the TBS index 1, and the MCS index 0 corresponds to the modulation mode QPSK. When I_SF=4, 5, 6, 7, the MCS index 0 corresponds to the TBS index 0, and the MCS index 0 corresponds to the modulation mode QPSK. But for the MCS index 6, when I_SF=0, 1, the MCS index 6 corresponds to the TBS index 9, and the MCS index 6 corresponds to the modulation mode QPSK. When I_SF=2, 3, the MCS index 6 corresponds to the TBS index 8, and the MCS index 6 corresponds to the modulation mode QPSK. When I_SF=4, 5, 6, 7, the MCS index 6 corresponds to the TBS index 6, and the MCS index 6 corresponds to the modulation mode 16 QAM.

TABLE 7

| MCS Index $I_{MCS}$ | Modulation Order $Q_m$ | | | TBS Index $I_{TBS}$ | | |
|---|---|---|---|---|---|---|
| | I_SF = 0, 1 | I_SF = 2, 3 | I_SF = 4, 5, 6, 7 | I_SF = 0, 1 | I_SF = 2, 3 | I_SF = 4, 5, 6, 7 |
| 0 | 2 | 2 | 2 | 1 | 1 | 0 |
| 1 | 2 | 2 | 2 | 3 | 3 | 1 |
| 2 | 2 | 2 | 2 | 5 | 4 | 2 |
| 3 | 2 | 2 | 2 | 6 | 5 | 3 |
| 4 | 2 | 2 | 2 | 7 | 6 | 4 |
| 5 | 2 | 2 | 2 | 8 | 7 | 5 |
| 6 | 2 | 2 | 4 | 9 | 8 | 6 |
| 7 | 2 | 2 | 4 | 10 | 9 | 7 |
| 8 | 2 | 2 | 4 | 11 | 10 | 8 |
| 9 | 2 | 2 | 4 | 12 | 11 | 9 |
| 10 | 2 | 4 | — | 13 | 12 | 10 |
| 11 | 4 | 4 | — | 14 | 13 | 11 |
| 12 | 4 | 4 | — | 15 | 14 | 12 |
| 13 | 4 | 4 | — | 16 | 15 | 13 |
| 14 | 4 | 4 | — | 17 | 16 | 14 |
| 15 | 4 | 4 | — | 18 | 17 | 15 |

It should be understood that, similarly to Table 5, each element in Table 7 exists independently. These elements are listed in the same table for example, but it does not mean that all elements in the table should exist at the same time, as shown in the table. The value of each element is independent on the value of any other element in Table 7. Thus, those skilled in the art may understand that the value of each element in Table 7 can be considered as an independent embodiment.

The mapping relationship table of the MCS indexes and the TBS indexes provided in the embodiments of the disclosure restricts the number of TBS indexes with smaller TBS index values in the mapping relationship table, and more TBS indexes with bigger TBS index values are used, to achieve using the TBS index with a bigger index value to map the MCS index during the data transmission, thus meeting the communication requirement of 16 QAM, and ensuring the system performance.

Based on the same concept, the embodiments of the disclosure further provide a data transmission apparatus.

It can be understood that, in order to implement the above-mentioned functions, the data transmission apparatus provided by the embodiments of the present disclosure includes corresponding hardware structures and/or software modules for executing each function. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods for each specific application to implement the described functions, but such implementation should not be considered beyond the scope of the technical solutions of the embodiments of the present disclosure.

Figure 3:
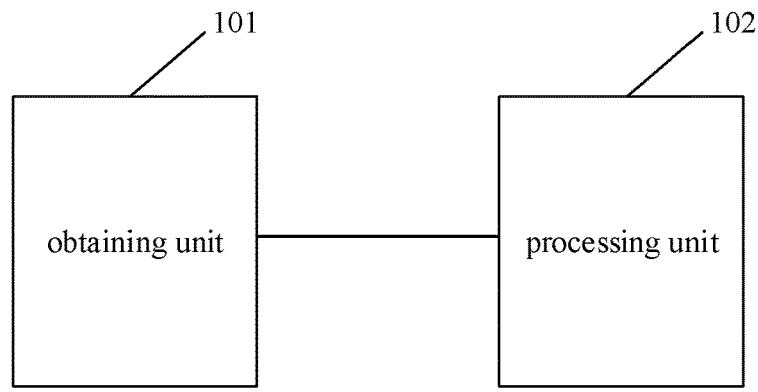
FIG. 3 is a block diagram illustrating a data transmission apparatus according to an embodiment of the disclosure.

FIG. 3 is a block diagram of a data transmission apparatus according to an embodiment. As illustrated in FIG. 3, the data transmission apparatus 100 includes an obtaining unit 101 and a processing unit 102. The obtaining unit 101 is configured to obtain a first parameter, in which the first parameter is configured to indicate a modulation and coding scheme (MCS) index. The processing unit 102 is configured to determine a transport block size (TBS) index based on a mapping relationship table of MCS indexes and TBS indexes, in which the mapping relationship table comprises a first number of TBS indexes, and a number of TBS indexes with values less than a predetermined TBS index value in the first number of TBS indexes is less than a second number; and determine a TBS based on the determined TBS index.

In an implement, the second number is less than or equal to the predetermined TBS index value.

In another implementation, the TBS indexes with values less than the predetermined TBS index value in the first number of TBS indexes have discontinuous index values.

In another implementation, TBS indexes with values greater than the predetermined TBS index value in the first number of TBS indexes have continuous index values.

In another implementation, the TBS indexes included in the mapping relationship table are determined based on an assigned resource amount.

In another implementation, for different assigned resource amounts, TBS indexes supported are the same or different.

In another implementation, for different assigned resource amounts, modulation modes corresponding to different MCS indexes are the same or different.

In another implementation, for different assigned resource amounts, a same correspondence between the MCS indexes and the TBS indexes exists and MCS indexes correspond to a same modulation mode.

In another implementation, for different assigned resource amounts, different correspondences between the MCS indexes and the TBS indexes exist and MCS indexes correspond to a same modulation mode.

In another implementation, for different assigned resource amounts, different correspondences between the MCS indexes and the TBS indexes exist and MCS indexes correspond to different modulation modes.

Regarding the apparatus in the above embodiment, the specific manner in which each module performs operations has been described in detail in the embodiment of the method, and will not be described in detail here.

Figure 4:
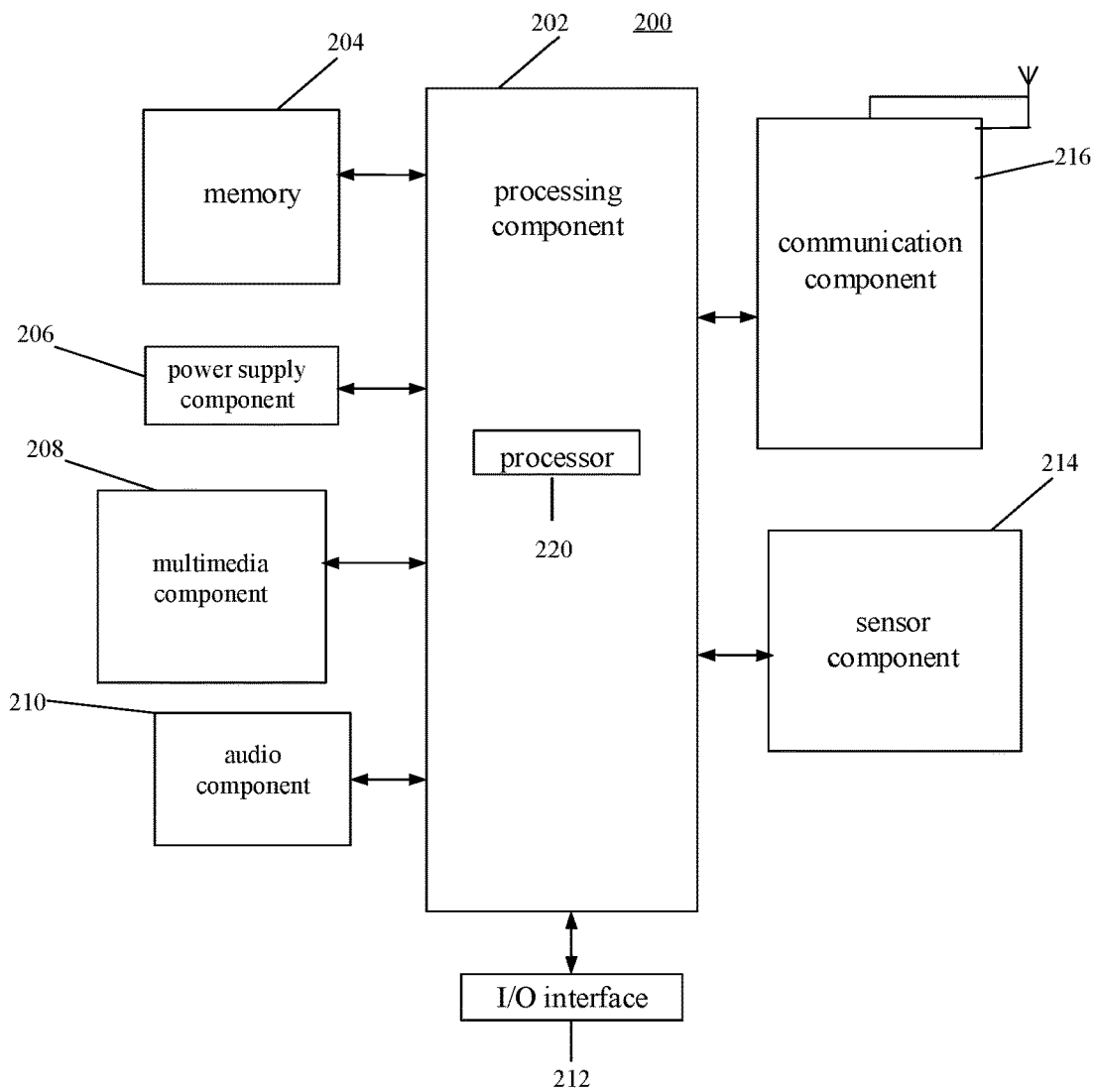
FIG. 4 is a block diagram illustrating a data transmission device according to an embodiment of the disclosure.

FIG. 4 is a block diagram illustrating a data transmission device 200 according to an embodiment of the disclosure. For example, the device 200 may be a mobile phone, a computer, a digital broadcasting UE, a messaging device, a game console, a tablet device, a medical equipment, a fitness equipment, a personal digital assistant, and so on.

Referring to FIG. 4, the device 200 may include one or more components of the followings: a processing component 202, a memory 204, a power supply component 206, a multimedia component 208, an audio component 210, an input/output (I/O) interface 212, a sensor component 214, and a communication component 216.

The processing component 202 generally controls the whole operation of the device 200, such as the operations related to display, phone call, data communication, camera operation and recording operation. The processing component 202 may include one or more modules to perform instructions, to complete all or part of blocks of the above method. In addition, the processing component 202 may include one or more modules for the convenience of interaction between the processing component 202 and other components. For example, the processing component 202 may include a multimedia module for the convenience of interaction between the multimedia component 208 and the processing component 202.

The memory 204 is configured to store all types of data to support the operation of the device 200. Examples of the data include the instructions of any applications or methods operated on the device 200, contact data, phone book data, messages, pictures, videos, etc. The memory 204 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 206 may provide power for all components of the device 200. The power supply component 206 may include a power supply management system, one or more power supplies, and other units related to generating, managing and distributing power for the device 200.

The multimedia component 208 includes an output interface screen provided between the device 200 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 208 includes a front camera and/or a rear camera. When the device 200 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 210 is configured to output and/or input an audio signal. For example, the audio component 210 includes a microphone (MIC). When the device 200 is in an operation mode, such as a call mode, a record mode, and a speech recognition mode, the microphone is configured to receive the external audio signal. The received audio signal may be further stored in the memory 204 or sent via the communication component 216. In some embodiments, the audio component 210 further includes a speaker configured to output an audio signal.

The I/O interface 212 provides an interface for the processing component 202 and the peripheral interface module, and the peripheral interface module may be a keyboard, a click wheel, a button, etc. The button may include but not limited to a home button, a volume button, a start button and a lock button.

The sensor component 214 includes one or more sensors, configured to provide various aspects of status assessment for the device 200. For example, the sensor component 214 may detect the on/off state of the device 200 and the relative positioning of the component. For example, the component is a display and a keypad of the device 200. The sensor component 214 may further detect the location change of the device 200 or one component of the device 200, the presence or absence of contact between the user and the device 200, the orientation or acceleration/deceleration of the device 200, and the temperature change of the device 200. The sensor component 214 may include a proximity sensor configured to detect the existence of the objects nearby without any physical contact. The sensor component 214 may further include a light sensor such as a complementary metal oxide semiconductor (CMOS) or a charge-coupled device (CCD) image sensor, which is configured to use in imaging applications. In some embodiments, the sensor component 214 may further include an acceleration transducer, a gyroscope sensor, a magnetic sensor, a pressure sensor or a temperature sensor.

The communication component 216 is configured for the convenience of wire or wireless communication between the device 200 and other devices. The device 200 may access wireless networks based on communication standard, such as Wi-Fi, 2G or 3G, or their combination. In an embodiment, the communication component 216 receives broadcast signals or broadcast-related information from an external broadcast management system via a broadcast channel. In an embodiment, the communication component 216 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 204 including executable instructions, the executable instructions may be executed by the processor 220 of the device 200 to complete the above methods. For example, the non-transitory computer-readable storage medium may be a ROM, a random access memory (RAM), a CD-ROM, a magnetic tape, a floppy disk, an optical data storage device, etc.

It should be further understood that in the present disclosure, "plurality" refers to two or more, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship. The singular forms "a," "the," and "the" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, first information may also be referred to as second information, and similarly, second information may also be referred to as first information without departing from the scope of the present disclosure.

It is further to be understood that, although the operations in the embodiments of the present disclosure are described in a specific order in the drawings, it should not be construed as requiring that the operations be performed in the specific order shown or the serial order, or requiring Perform all operations shown to obtain the desired result. In certain circumstances, multitasking and parallel processing may be advantageous.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, the true scope and spirit of the disclosure being indicated by the following claims.

It should be understood that the disclosure is not limited to the precise structure described above and shown in the drawings, and various modifications and changes may be made without departing from its scope. The scope of the present disclosure is only limited by the appended claims.

The invention claimed is:

1. A data transmission method, comprising:
obtaining a first parameter, wherein the first parameter is configured to indicate a modulation and coding scheme (MCS) index;
determining a transport block size (TBS) index based on a mapping relationship table of MCS indexes and TBS indexes, wherein the mapping relationship table comprises a first number of TBS indexes, and a number of TBS indexes with values less than a predetermined TBS index value in the first number of TBS indexes is less than a second number; and
determining a TBS based on the determined TBS index;
wherein the TBS indexes with values less than the predetermined TBS index value in the first number of TBS indexes have discontinuous index values;
wherein the TBS indexes comprised in the mapping relationship table are determined based on an assigned resource amount;
wherein for different assigned resource amounts, correspondences between the MCS indexes and the TBS indexes are different and the MCS indexes correspond to different modulation modes.

2. The method of claim 1, wherein the second number is less than or equal to the predetermined TBS index value.

3. The method of claim 1, wherein TBS indexes with values greater than the predetermined TBS index value in the first number of TBS indexes have continuous index values.

4. The method of claim 1, wherein for different assigned resource amounts, TBS indexes supported are the same or different.

5. The method of claim 1, wherein for different assigned resource amounts, modulation modes corresponding to different MCS indexes are the same or different.

6. The method of claim 1, wherein for different assigned resource amounts, correspondences between the MCS indexes and the TBS indexes are the same and the MCS indexes correspond to a same modulation mode.

7. The method of claim 1, wherein for different assigned resource amounts, correspondences between the MCS indexes and the TBS indexes are different and the MCS indexes correspond to a same modulation mode.

8. A data transmission device, comprising:
a processor; and
a memory configured to store instructions executable by the processor;
wherein the processor is configured to perform the following:
obtaining a first parameter, wherein the first parameter is configured to indicate a modulation and coding scheme (MCS) index;
determining a transport block size (TBS) index based on a mapping relationship table of MCS indexes and TBS indexes, wherein the mapping relationship table comprises a first number of TBS indexes, and a number of TBS indexes with values less than a predetermined TBS index value in the first number of TBS indexes is less than a second number; and
determining a TBS based on the determined TBS index;
wherein the TBS indexes with values less than the predetermined TBS index value in the first number of TBS indexes have discontinuous index values;
wherein the TBS indexes comprised in the mapping relationship table are determined based on an assigned resource amount;
wherein for different assigned resource amounts, correspondences between the MCS indexes and the TBS indexes are different and the MCS indexes correspond to different modulation modes.

9. A non-transitory computer-readable storage medium, wherein when instructions stored in the storage medium are executed by a processor of a mobile terminal, the mobile terminal is caused to perform the following:
obtaining a first parameter, wherein the first parameter is configured to indicate a modulation and coding scheme (MCS) index;
determining a transport block size (TBS) index based on a mapping relationship table of MCS indexes and TBS indexes, wherein the mapping relationship table comprises a first number of TBS indexes, and a number of TBS indexes with values less than a predetermined TBS index value in the first number of TBS indexes is less than a second number; and
determining a TBS based on the determined TBS index;
wherein the TBS indexes with values less than the predetermined TBS index value in the first number of TBS indexes have discontinuous index values;
wherein the TBS indexes comprised in the mapping relationship table are determined based on an assigned resource amount;
wherein for different assigned resource amounts, correspondences between the MCS indexes and the TBS indexes are different and the MCS indexes correspond to different modulation modes.

10. The device of claim 8, wherein the second number is less than or equal to the predetermined TBS index value.

11. The device of claim 8, wherein TBS indexes with values greater than the predetermined TBS index value in the first number of TBS indexes have continuous index values.

12. The device of claim 8, wherein for different assigned resource amounts, TBS indexes supported are the same or different.

13. The device of claim 8, wherein for different assigned resource amounts, modulation modes corresponding to different MCS indexes are the same or different.

14. The device of claim 8, wherein for different assigned resource amounts, correspondences between the MCS indexes and the TBS indexes are the same and the MCS indexes correspond to a same modulation mode.

15. The device of claim 8, wherein for different assigned resource amounts, correspondences between the MCS indexes and the TBS indexes are different and the MCS indexes correspond to a same modulation mode.

* * * * *